(12) United States Patent
Melhem et al.

(10) Patent No.: US 12,228,336 B2
(45) Date of Patent: Feb. 18, 2025

(54) AI-ENABLED GAS PLANT MONITORING AND OPTIMIZATION THROUGH COMPUTER VISION

(71) Applicant: SAUDI ARABIAN OIL COMPANY, Dhahran (SA)

(72) Inventors: Bashar Y. Melhem, Abqaiq (SA); Mishar Kumar Paul, Calgary (CA); Eisa A. Almakrami, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 375 days.

(21) Appl. No.: 17/655,713

(22) Filed: Mar. 21, 2022

(65) Prior Publication Data
US 2023/0296313 A1    Sep. 21, 2023

(51) Int. Cl.
*F25J 3/02* (2006.01)
*G05B 13/02* (2006.01)

(52) U.S. Cl.
CPC .......... *F25J 3/0295* (2013.01); *G05B 13/027* (2013.01)

(58) Field of Classification Search
CPC ............... F25J 3/0295; G05B 13/027; B01D 2252/20484; B01D 2252/20489; B01D 53/1412; B01D 53/1462; C10L 2290/58; C10L 2290/60; C10L 3/10
See application file for complete search history.

(56) References Cited

U.S. PATENT DOCUMENTS

| | | | |
|---|---|---|---|
| 2007/0035736 A1* | 2/2007 | Vannuffelen | .......... E21B 49/087 356/432 |
| 2020/0110399 A1 | 4/2020 | Cella et al. | |
| 2020/0133257 A1 | 4/2020 | Cella et al. | |
| 2020/0157929 A1* | 5/2020 | Torrione | ................. E21B 44/00 |
| 2022/0057786 A1* | 2/2022 | Phan | ...................... G06N 5/046 |
| 2023/0192522 A1* | 6/2023 | Waite | ........................ C02F 1/78 210/638 |

* cited by examiner

*Primary Examiner* — Zhipeng Wang
(74) *Attorney, Agent, or Firm* — Osha Bergman Watanabe & Burton LLP (57) ABSTRACT

A method to optimize a gas processing plant with control parameters. The method includes acquiring a plurality of images, using a camera, of an incoming contaminated fluid and processing, by a computer processor, the plurality of images by a machine-learned model to produce a contamination estimate. The method further includes adjusting the control parameters of the gas processing plant, forming adjusted control parameters based on, at least in part, the contamination estimate. The method further includes receiving a plurality of data signals from a plurality of sensors configured to monitor sub-processes of the gas processing plant and validating the adjusted control parameters with the received data signals by verifying that the adjusted control parameters optimize, or at least improve the performance of, the gas processing plant.

21 Claims, 7 Drawing Sheets

AI-ENABLED GAS PLANT MONITORING AND OPTIMIZATION THROUGH COMPUTER VISION

BACKGROUND

Gas processing encompasses a wide range of industrial processes that seek to separate and extract desired gaseous hydrocarbons. Depending on the application, the exact tools, methods, and industrial processes may vary, however, gas processing generally consists of removing impurities and contaminants from an incoming fluid to purify a desired gas to a pre-defined standard. The incoming fluid may be multi-phase and be composed of many different solid, liquid, and gas constituents. Contaminants may include solids like sand, liquid like water or crude oil, and other gases.

A gas processing plant may employ various "sub-processes", or methods and industrial processes, in series and/or in parallel. Typically, each sub-process is governed by a set of control parameters. As a non-limiting example, control parameters may be the temperature of the environment of a sub-process, or the flow rate of a fluid, or the amount of chemical additives used in a sub-process. The efficacy of the sub-processes is sensitive to the control parameters and instantaneous state of the incoming fluid. As such, to optimize a gas processing plant, the control parameters of the associated sub-processes should be adjusted according to the type and quantity of contaminants in the incoming fluid.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Embodiments and disclosed, generally relating to a method to optimize a gas processing plant with control parameters. The method includes acquiring a plurality of images, using a camera, of an incoming contaminated fluid and processing, by a computer processor, the plurality of images by a machine-learned model to produce a contamination estimate. The method further includes adjusting the control parameters of the gas processing plant, forming adjusted control parameters based on, at least in part, the contamination estimate. The method further includes receiving a plurality of data signals from a plurality of sensors configured to monitor sub-processes of the gas processing plant and validating the adjusted control parameters with the received data signals by verifying that the adjusted control parameters optimize, or at least improve the performance of, the gas processing plant.

Embodiments and disclosed, generally relating to a non-transitory computer readable medium storing instructions executable by a computer processor. The instructions include functionality for receiving a plurality of images from a camera of an incoming contaminated fluid and processing the plurality of images by a machine-learned model to produce a contamination estimate. The instructions further include functionality for adjusting a plurality of control parameters for a gas processing plant, forming adjusted control parameters based on, at least in part, the contamination estimate. The instructions further include functionality for receiving a plurality of data signals from a plurality of sensors configured to monitor sub-processes of the gas-processing plant and validating the adjusted control parameters with the received data signals by verifying that the adjusted control parameters optimize, or at least improve the performance of, the gas processing plant.

Embodiments and disclosed, generally relating to a system to process gas at a gas processing plant. The gas processing plant includes a plurality of sub-processes and associated mechanical devices wherein each sub-process is governed by a plurality of control parameters, wherein the plurality of control parameters includes an amount of an anti-foam agent to be injected into the plurality of sub-processes of the gas processing plant. The gas processing plant further includes a plurality of sensors which produce a plurality of data signals, a plurality of controllers wherein the plurality of controllers receive the plurality of data signals and can adjust the plurality of control parameters, an incoming contaminated fluid, and a camera, capable of capturing images in real-time, with optical access to the incoming contaminated fluid. The system further includes a computer communicably connected to the plurality of controllers and the camera. The computer includes one or more computer processors, and a non-transitory computer readable medium storing instructions executable by a computer processor. The instructions include functionality for acquiring a plurality of images from the camera of the incoming contaminated fluid, processing the plurality of images by a machine-learned model to produce a contamination estimate, and adjusting, either automatically or with a human-in-the-loop, the control parameters of the sub-processes of the gas processing plant, forming an adjusted control parameters based on, at least in part, the contamination estimate. The instructions further include functionality for receiving the plurality of data signals, and validating the adjusted control parameters with the received data signals by verifying that the adjusted control parameters optimize, or at least improve the performance of, the gas processing plant.

Other aspects and advantages of the claimed subject matter will be apparent from the following description and the appended claims.

DETAILED DESCRIPTION

Gas processing encompasses a wide range of industrial processes that seek to separate and extract desired gaseous hydrocarbons from an incoming contaminated fluid. The incoming fluid may be multi-phase and be composed of many different solid, liquid, and gas constituents. Contaminants may include solids like sand, liquid like water or crude oil, and other gases. A gas processing plant may employ various "sub-processes," or methods and industrial processes, in series and/or in parallel. Additionally, the sub-processes may be arranged in a cyclical manner. Typically, each sub-process is governed by a set of control parameters. As a non-limiting example, control parameters may be the temperature of the environment of a sub-process, or the flow rate of a fluid, or the amount of a chemical additive used in a sub-process.

Figure 1:
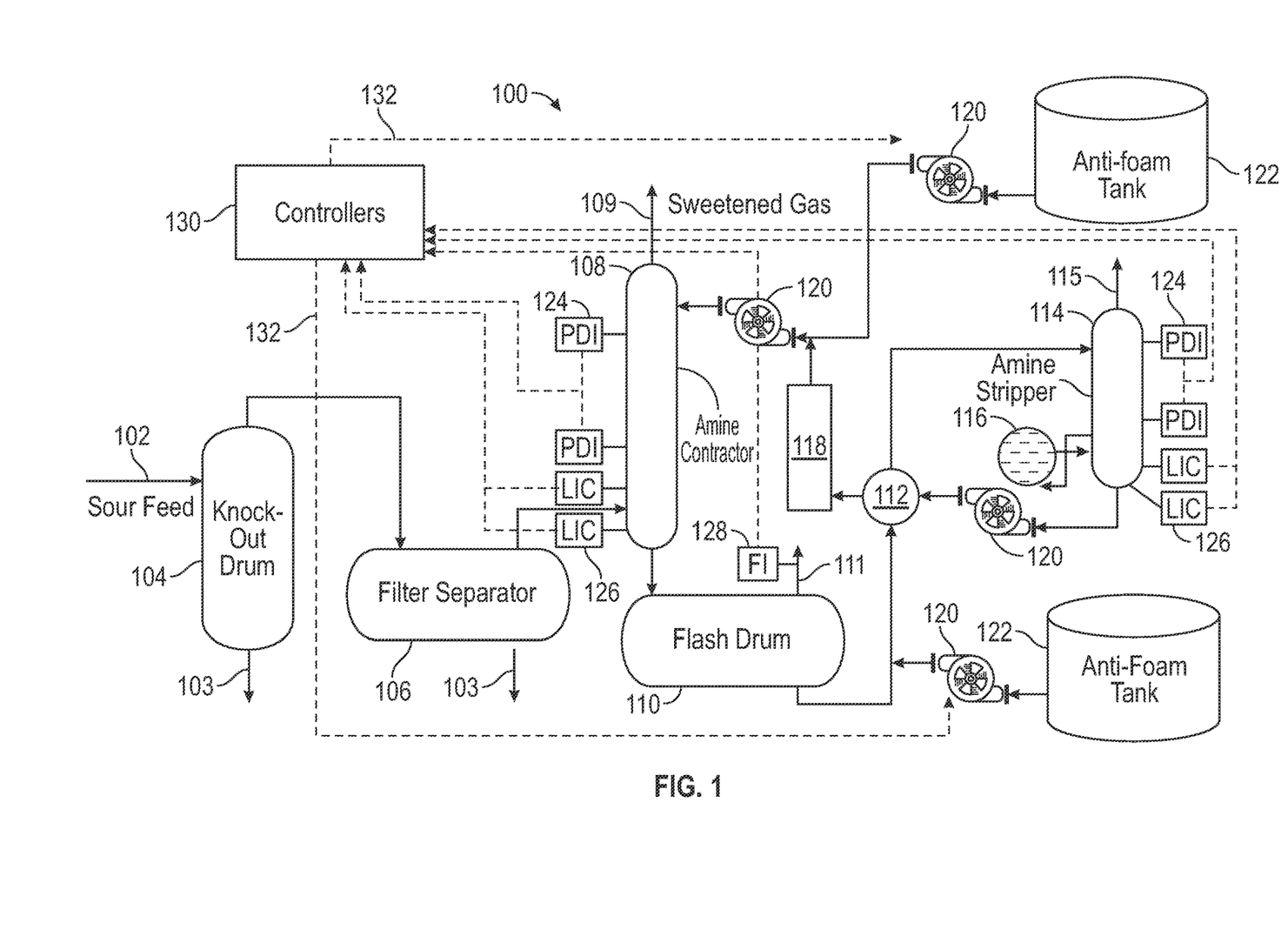
FIG. 1 depicts an exemplary gas processing plant, in accordance with one or more embodiments.

FIG. 1 depicts the flow of fluid through an exemplary gas processing plant (100). One with ordinary skill in the art will recognize that gas processing plants (100) may be configured in a variety of ways according to plant-specific needs and applications. As such, the set of sub-processes shown in FIG. 1, and their arrangement, are non-limiting. Additionally, sub-processes are often associated with a mechanical device, such as a tank or a heat exchanger. For the purposes of FIG. 1, components of the gas processing plant (100), may be described according to their function (sub-process) or their mechanical form without undue ambiguity. In other words, a tank or a drum may herein be described as a sub-process or a mechanical device.

Contaminations in hydrocarbon (HC) feeds of a gas processing facility is an ongoing challenge as it causes operational upsets resulting in increases of maintenance cost and loss of production. Early identification and quantification the level of the contaminations in the HC feeds enables to take adequate preventive action in order to minimize operational upsets, reduce down time and maintenance cost as well as increase the productivity.

Embodiments disclosed herein relate to identifying and classifying the contaminations (solids, liquids (HC & water)) in the feeds by using a high-resolution in-process stream camera, which is then analyzed through an artificial intelligence engine (AI-engine) employing, for example, deep learning (DL) neural network machine learning (ML) models in order to classify the type of contamination. Further, embodiments disclosed herein describe a closed loop control algorithm to take adequate preventative actions in terms of adjusting required chemicals or change of operating parameters ahead of time to minimize operation upset, reduce maintenance cost and increase production.

FIG. 1 illustrates an example gas processing system. As shown in FIG. 1, an incoming contaminated fluid (102) is sent to a gas processing plant (100) via a pipeline. The incoming contaminated fluid (102) may be called the "sour feed." The incoming contaminated fluid (102) may be multi-phase and be composed of a variety of solid, liquid, and gaseous constituents. For example, the incoming contaminated fluid (102) may contain solid particulates like sand, mineral precipitates such as pipe scale, and corroded pipe, liquid such as water, and gases like carbon dioxide (CO2) and hydrogen sulfide (H2S). In particular, H2S, in the presence of water, is highly corrosive and should be removed to prevent a leak in the pipeline. Additionally, the incoming contaminated fluid (102) may contain liquid and gas forms of various hydrocarbons.

In the example gas processing plant (100) of FIG. 1, the incoming contaminated fluid (102), or sour feed, is processed by a knock-out drum (104). The knock-out drum (104) performs bulk separation of gas and liquid. Liquid, separated from the incoming contaminated fluid (102), exits the knock-out drum (104) through a liquid exit (103).

From the knock-out drum (104), the bulk gas is processed by a filter separator (106). A filter separator (106) removes impurities such as mineral precipitates (e.g. pipe scale), water, liquid hydrocarbons, and iron sulfide from the fluid. A filter separator (106) uses filter elements, such as a replaceable sock or a coalescing filter, rather than mechanical components to separate out contaminants. According to the application, a filter separator (106) may be composed of 1 or 2 stages and may operate at high or low pressure. Again, the unwanted portions of the incoming contaminated fluid (102) exit the filter separator (106) through an exit (103).

After the filter separator (106), the incoming contaminated fluid (102) has been reduced to a gaseous stream. The gaseous stream undergoes another purifying sub-process through an amine contactor (108). An amine contactor (108) absorbs carbon dioxide (CO2) and/or hydrogen sulfide (H2S) contaminants from the gaseous stream. In general, an amine contactor (108), receives the partially processed incoming contaminated fluid (102), or gaseous stream, and a "lean" amine liquid. Common amines are diethanolamine (DEA), monoethanolamine (MEA), methyldiethanolamine (MDEA), diisopropanolamine (DIPA), and aminoethoxyethanol (Diglycolamine) (DGA). The contact between the gaseous stream and the lean amine liquid drives the absorption of CO2 and/or H2S into the amine liquid from the gaseous stream. As a result, decontaminated gas (109), also known as "sweetened gas", may exit the amine contactor (108). The decontaminated gas (109) should be checked to make sure it meets specifications. If the decontaminated gas (109) does not meet specifications, this is indicative that control parameters within the gas processing plant (100) require adjustment. The sub-processes of the knock-out drum (104), filter separator (106), and amine contactor (108) effectively transform the incoming contaminated fluid (102) to a decontaminated gas (109) and complete the objective of the gas processing plant (100). However, additional processes are required to maintain the gas processing plant (100) in an operational state. For example, the liquid amine that has absorbed the unwanted CO2 and H2S, which is called "rich" amine, is sent to an amine stripper for removal of its contaminants and re-conditioning.

As shown in FIG. 1, the contaminated amine is first sent to a flash drum (110). This sub-process consists of throttling the contaminated amines causing a pressure drop such that vapors are formed. The vapors exit the flash drum where they undergo further processing, such as being passed to an oxidizer. These steps have been omitted from FIG. 1 for brevity.

The remaining liquid contaminated amines enter a heat exchanger (112). The heat exchanger (112) recovers heat from the decontaminated amine leaving the amine stripper (114), which is described below. Consequently, the heat exchanger (112) heats the contaminated amine before entering the amine stripper (114).

The amine stripper (114) serves to remove the absorbed contaminants, such as H2S and CO2, from the amine solution so that it can be used again in the amine contactor (108). The amine stripper (114) is equipped with a reboiler (116). The amine stripper (114) contains a tray column consisting of a stripping section and a water wash section at the top. The reboiler (116) takes the amine solution located at the bottom of the amine stripper (114) and partially boils it. Steam (hot, gaseous water) is typically used as the heat source in the reboiler (116). Steam, typically sourced from the reboiler (116), flows up the column in the amine stripper (114) and contacts the contaminated amine solution flowing down within the column. As the contaminated amine contacts the steam, it is heated up and the contaminants are stripped out of the rich amine solution and flow to the stripping section of the column.

The stripped gases, commonly referred to as amine acid gas, leaves the amine stripper through a stripped gas exit (115). The stripped gases undergo further processing, such as condensing out the water and passing the remaining acid gases to a sulfur recovery process, but these processes are not shown in FIG. 1 for brevity.

The decontaminated amine solution, leaving the bottom of the amine stripper (114), contains very low quantities of acid gas (such as H2S). This decontaminated amine solution may be recycled in a lean amine storage tank (not shown) and/or returned to the amine contactor (108). As shown in FIG. 1., the decontaminated amine solution leaving the amine stripper (114) is passed through the heat exchanger (112), to transfer heat to the contaminated amine solution leaving the flash drum (110). After passing through the heat exchanger (112), the decontaminated amine solution may be further cooled in a cooler (118) before being returned to the amine contactor (108).

The transport of the various fluids of the gas processing plant of FIG. 1 is facilitated by a plurality of pumps and/or compressors (120) disposed throughout the system. The type of pump or compressor (120), and the location may be altered and arranged according to plant-specific needs.

As noted above, it is emphasized that a gas processing facility (100) may implement different sub-processes and mechanisms for achieving adequate gas processing. Some sub-processes may include compression, stabilization, and dehydration. The gas processing plant (100) may also encompass the treatment of removed water for disposal through sub-processes such as filtration and deionization. Additionally, elements for heating and cooling may be provided to prevent the formation of hydrates, and mitigate corrosion and aid in dehydration, respectively. With respect to decontaminating the incoming contaminated fluid (102), other chemical and physical washes may be used without departing from the scope of this disclosure.

As shown in FIG. 1, the sub-processes may be monitored and controlled by a plurality of sensors and controllers. As an example, the amine contactor (108) and amine stripper (114) are both equipped with pressure differential indicators (PDI) (124) and level indicators (LIC) (126) in FIG. 1. Additionally, FIG. 1 depicts a flow indicator (FI) (128) connected to the exit of the flashed gases exiting the flash drum (110). The PDIs, LICs, and FIs, which are sensors, may send information regarding the pressure difference measured across sub-processes, the quantity and level of fluids present, and the flow rate of fluids, respectively, to a plurality of controllers (130). Flow indicators (FIs) disposed throughout the gas processing plant (100) may be multi-phase flow indicators.

The plurality of controllers (130) may herein be referred to as "controllers" or "controller" where appropriate. Controllers (130) may be distributed, local to the sub-processes and associated device, global, connected, etc. Controllers (130) may include a programmable logic controller (PLC), a distributed control system (DCS), a supervisory control and data acquisition (SCADA), and/or a remote terminal unit (RTU). For example, a programmable logic controller (PLC) may control valve states, fluid levels, pipe pressures, warning alarms, and/or pressure releases throughout a gas processing plant (100). In particular, a programmable logic controller (PLC) may be a ruggedized computer system with functionality to withstand vibrations, extreme temperatures, wet conditions, and/or dusty conditions, for example, around a refinery. A distributed control system may be a computer system for managing various processes at a gas processing plant (100) using multiple control loops. As such, a distributed control system may include various autonomous controllers (130) (such as remote terminal units) positioned at different locations throughout the facility to manage operations and monitor processes. Likewise, a distributed control system may include no single centralized computer for managing control loops and other operations. On the other hand, a SCADA system may include a control system that includes functionality for enabling monitoring and issuing of process commands through local control at a gas processing facility (100) as well as remote control outside the facility. With respect to an RTU, an RTU may include hardware and/or software, such as a microprocessor, that connects sensors and/or actuators using network connections to perform various processes in the automation system. Likewise, a control system may be coupled to one or more gas processing plant (100) devices.

FIG. 1 also depicts anti-foam tanks (122) which contain an anti-foaming agent that may be injected, by use of a pump (120) and a controller (130), into different parts of the gas processing system as indicated by the dashed line (132). The anti-foam tanks (122) and injection of an anti-foaming agent into the sub-processes of the gas processing plant (100) may be necessary because a frequent problem in gas processing plants (100) is foaming. This problem is usually the result of improper operating conditions in the sub-processes in conjunction with the presence of contaminants. A common mitigative action is to inject an anti-foaming agent into the system.

Foam is the result of a mechanical incorporation of a gas into a liquid, in a multi-phase fluid, where the liquid surrounds a volume of gas creating a bubble. The liquid entrained between the gas bubbles begins to drain as the bubbles rise past the bulk gas/liquid interface. If bubbles are being formed at a faster rate than the existing ones are breaking, and faster than the entrained liquid is draining, the bubbles will accumulate as foam.

Anti-foaming agents for gas processing plants (100) are usually non-ionic surfactants that act to lower the surface tension of the gas/liquid interface. Lowering the surface tension at this interface aids in draining liquid entrapped between bubbles present in a multi-phase fluid. The anti-foaming agent is intended to facilitate gas and liquid disengagement by weakening the cell structure of the bubbles.

Foaming throughout the gas processing plant (100) may be detected using the embedded sensors (124, 126, 128, and others not shown) in the sub-processes. For example, some indicators of foaming may include, but are not limited to: a sudden increase in differential pressure in the amine contactor (108) or amine stripper (114); an irregular or drastic drop in liquid levels in the amine contactor (108) or amine stripper (114); and/or a precipitous increase in the flow of flashed gases. Depending on the location and suspected cause of foaming, various foam reduction procedures may be taken such as, but not limited to: adjusting the pressure of the flash drum (110); adjusting the temperature of the lean amine solution entering the amine contactor (108); adjusting the amine solution.

While the sensors (124, 126, 128, and others not shown) and controllers (130) are necessary for safe and effective operation of a gas processing plant (100), often their use is inherently reactive to the composition of the incoming contaminated fluid (102). Therefore, it would be beneficial to inspect, and characterize, the incoming contaminated fluid (102) in real-time, or near real-time, such that sub-process control parameters may be adjusted concurrently and proactively. For example, anti-foam agent may be injected into the system, as directed by the controllers (130) in anticipation of the type and quantity of contaminants currently present in the incoming contaminated fluid (102) such that the gas processing plant (100) operation is optimized.

Figure 2:
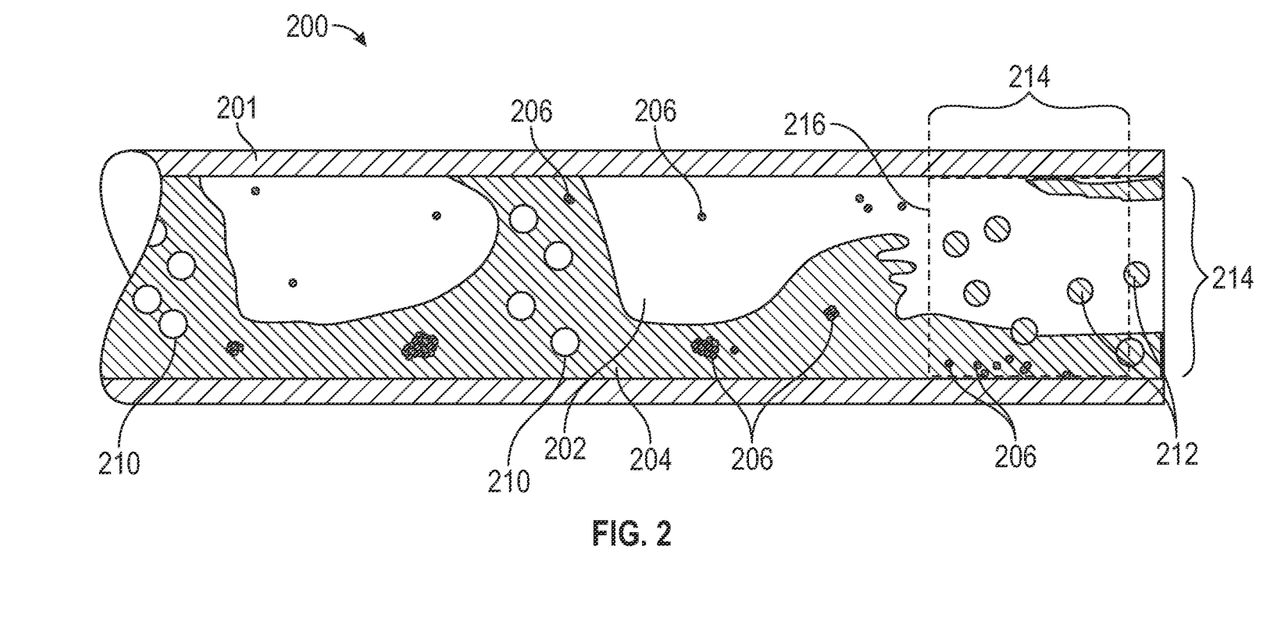
FIG. 2 illustrates an incoming fluid, in accordance with one or more embodiments.

In one aspect, embodiments disclosed herein relate to a system for qualifying and classifying the composition of an incoming contaminated fluid (102) in a gas processing plant (100) so that sub-process control parameters may be adjusted proactively. FIG. 2 depicts a simplified view of a cross-section of a pipeline (201) carrying an incoming contaminated fluid (102). As seen, the incoming contaminated fluid (102) may have multiple phases with constituents in the gas (202), liquid (204), and solid (206) phases. The contaminants in the incoming contaminated fluid (102) may include solids (206) like sand, liquids (204) like water, crude oil, or machinery lube, and undesired gases (202) which may be acidic like $CO_2$ and $H_2S$. The various constituents and physical phases of matter may be distributed within the pipeline (201) in a myriad of ways. As a non-limiting example, gases (202) may be enclosed by liquids (204) forming bubbles (210). Or, in contrast, liquid (204) droplets may be dispersed in gases (202) to form a mist (212). In general, the state of the incoming contaminated fluid (102), and its multiple phases may be described using broad classifications. That is, the flow may be categorized as "bubbly", "annular", "churn", "mist", "stratified", or other designations based on the distribution of the constituents and their respective physical phases. The state of the incoming contaminated fluid (102) may be transient such that any assignment of flow class may change with time.

Figure 3A:
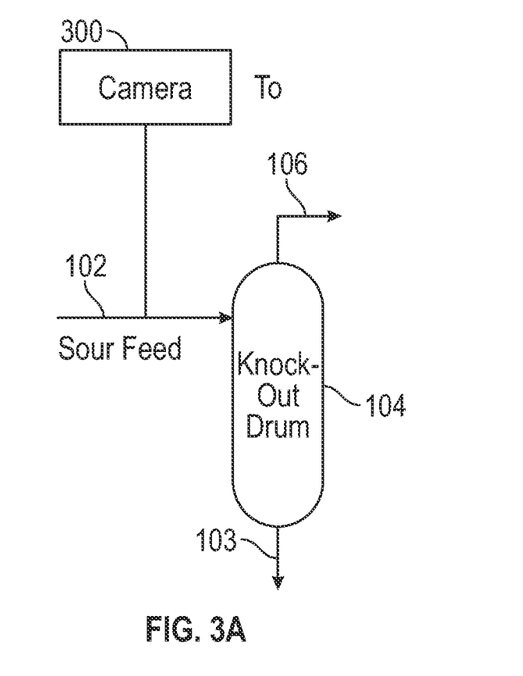
FIG. 3A depicts a camera in a gas processing plant, in accordance with one or more embodiments.

FIG. 3A depicts a portion of the gas processing plant (100). In accordance with one or more embodiments, a camera (300) is given optical access to the pipeline (201) of the incoming contaminated fluid (102). More specifically, the camera (300) is an in-stream camera that is inserted in the hydrocarbon flow lines within the pipeline. As shown in FIG. 3A, the camera (300) is positioned to acquire color images and/or a live color video stream of the incoming contaminated fluid (102). In FIG. 2, the field of view (214) of the camera (300) is shown. An image (216), shown by the dashed box in FIG. 2, is a visual spatial representation of the incoming contaminated fluid (102) within the field of view (214) of the camera (300) at an instance in time. The camera (300) is of high resolution, and of adequate frame rate, such that high-quality images (216) are obtained in real-time or near real-time. Any suitable camera that is capable of such in-process, high resolution images/video in real-time, now known or later developed, may be employed for embodiments disclosed herein.

In accordance with one or more embodiments, the images (216) acquired by the camera (300) may undergo pre-processing. Pre-processing of the images (216) may include normalizing the images. Additional techniques such as aggregating multiple images, or other methods designed to reduce noise in the image (216) and increase image (216) quality may be employed. One with ordinary skill in the art will appreciate that many image pre-processing techniques exist and the fact that they are not enumerated herein does not impose a limit on the present disclosure. In some embodiments, pre-processing of the images may not be required.

In accordance with one or more embodiments, the images (216) are processed with a machine-learned model to produce a categorical estimation (i.e., a classifier) of the contaminants present in the incoming contaminated fluid (102). Machine learning, broadly defined, is the extraction of patterns and insights from data. The phrases "artificial intelligence", "machine learning", "deep learning", and "pattern recognition" are often convoluted, interchanged, and used synonymously throughout the literature. This ambiguity arises because the field of "extracting patterns and insights from data" was developed simultaneously and disjointedly among a number of classical arts like mathematics, statistics, and computer science. For consistency, the term machine learning, or machine-learned, will be adopted herein, however, one skilled in the art will recognize that the concepts and methods detailed hereafter are not limited by this choice of nomenclature.

Machine-learned model types may include, but are not limited to, neural networks, random forests, generalized linear models, and Bayesian regression. Machine-learned model types are usually associated with additional "hyper-parameters" which further describe the model. For example, hyperparameters providing further detail about a neural network may include, but are not limited to, the number of layers in the neural network, choice of activation functions, inclusion of batch normalization layers, and regularization strength. The selection of hyperparameters surrounding a model is referred to as selecting the model "architecture". Generally, multiple model types and associated hyperparameters are tested and the model type and hyperparameters that yield the greatest predictive performance on a hold-out set of data is selected.

Figure 3B:
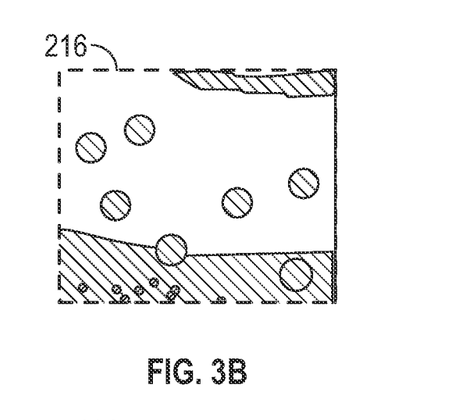
FIG. 3B shows a theoretical image of an incoming fluid, in accordance with one or more embodiments.
Figure 3C:
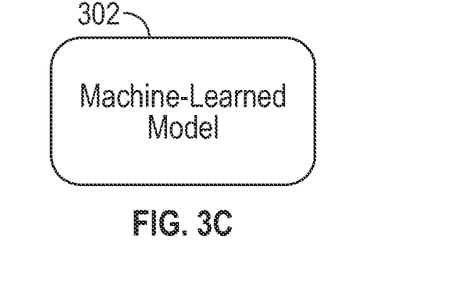
FIG. 3C depicts a machine-learned model, in accordance with one or more embodiments.

As noted, the objective of the machine-learned model is to identify and classify the contaminants in the in incoming contaminated fluid (102) and/or the state of the incoming contaminated fluid (102). FIG. 3B demonstrates an example image (216) acquired using the camera (300) embedded in the pipeline (201) of the incoming contaminated fluid (102). The image (216) may have undergone pre-processing. As shown in FIG. 3B, the fluid seen in the image (216) is multi-phase and contains contaminants. The image (216) is processed by a machine-learned model (302) represented in FIG. 3C. Depending on the model type, architecture, and training regimen, the machine-learned model (302) may be configured to produce a variety of outputs. The machine-learned model (302) may be trained using a data set of acquired images from a pipeline (201) of an incoming contaminated fluid (102). This data set may come from a pipeline (201) of an incoming contaminated fluid (102) associated with the gas processing plant (100) where the machine-learned model (302) will be deployed or from other gas processing plants (100) with similar incoming contaminated fluids (102). Additionally, the training data set may come from a pipeline (201), either in a laboratory setting or production setting, where various classifications describing the state of the incoming contaminated fluid (102) are induced to generate a labelled data set.

Figure 3D:
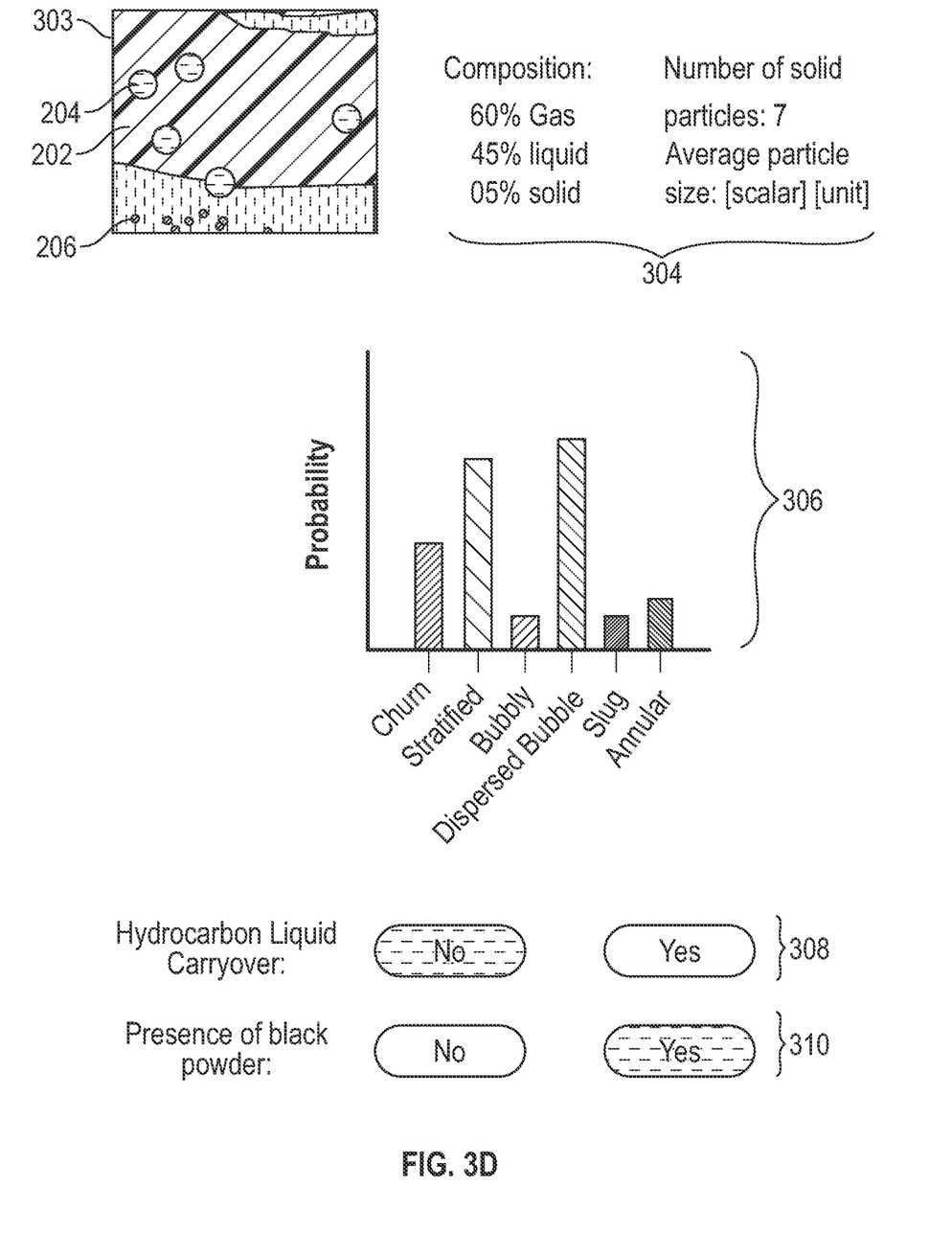
FIG. 3D shows example machine-learned model outputs, in accordance with one or more embodiments.

Examples of potential outputs generated by the machine-learned model (302) upon processing an image (216) are depicted in FIG. 3D. As illustrated, the machine-learned model (302) may be configured to produce a segmentation map (303). In general, a segmentation map is a classification of pixels, where pixels or local groups of pixels are assigned to a category. The segmentation map (303) shown in FIG. 3D segments portions of the image (216) according to physical phase—solid (206), liquid (204), or gas (202). However, the machine-learned model (302) may be configured to produce a segmentation map (303) with a greater number of segmentation classes. The segmentation map (303) may be further analyzed to produce composition information of the incoming contaminated fluid (102) and statistical descriptions of the solid (206) particle sizes (304).

Additional outputs of the machine-learned model (302) may include a probability distribution to predict the mostlikely classification of the incoming contaminated fluid (102) flow. For example, upon processing the image (216), the machine-learned model (302) may output a flow class, such as "churn", "stratified", "annular", etc. The machine-learned model (302) may output a categorization with greater refinement assigning a probability that the processed image (216) belongs to a given class. This output is shown in the portion labelled 306 of FIG. 3D. In accordance with one or more embodiments, the machine-learned model (302) may classify whether or not black powder is present (308) in the incoming contaminated fluid (102) and if there is hydrocarbon liquid carryover (310). In all cases, the machine-learned model (302) may be considered a classifier and the discretization, or refinement, of the categories is arbitrary and may be altered according to the needs and applications of the gas processing plant (100).

The machine-learned model (302) may be composed of multiple machine-learned models, acting in coordination or independently. In the case of multiple machine-learned models, these models may be ensembled together or each model may be responsible for producing a specific output; such as those shown in FIG. 3D. Additionally, the machine-learned model (302) may be supervised or unsupervised. In the latter case, categorical assignments may be made to the identified classes after detection.

Figure 4:
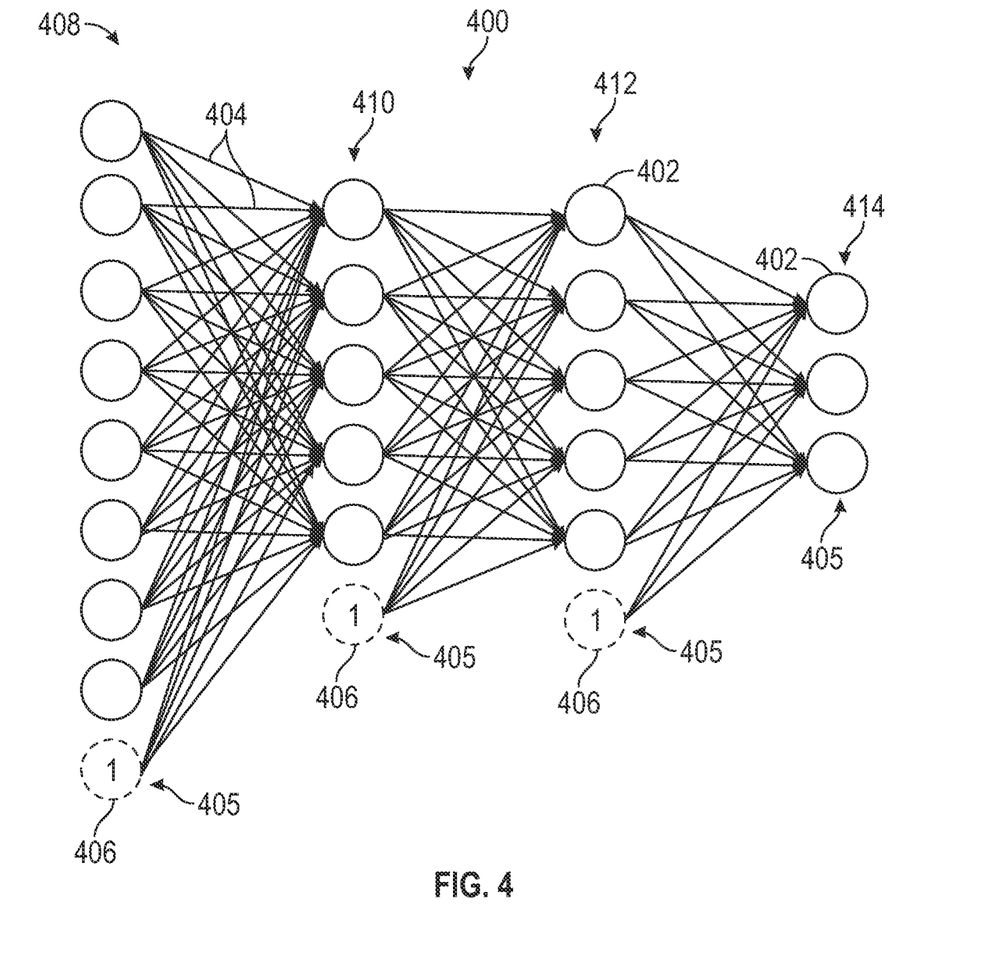
FIG. 4 illustrates a neural network, in accordance with one or more embodiments.

In accordance with one or more embodiments, the selected machine-learned model (302) type is a neural network. A diagram of a neural network is shown in FIG. 4. At a high level, a neural network (400) may be graphically depicted as being composed of nodes (402), where here any circle represents a node, and edges (404), shown here as directed lines. The nodes (402) may be grouped to form layers (405). FIG. 4 displays four layers (408, 410, 412, 414) of nodes (402) where the nodes (402) are grouped into columns, however, the grouping need not be as shown in FIG. 4. The edges (404) connect the nodes (402). Edges (404) may connect, or not connect, to any node(s) (402) regardless of which layer (405) the node(s) (402) is in. That is, the nodes (402) may be sparsely and residually connected. A neural network (400) will have at least two layers (405), where the first layer (408) is considered the "input layer" and the last layer (414) is the "output layer". Any intermediate layer (410, 412) is usually described as a "hidden layer". A neural network (400) may have zero or more hidden layers (410, 412) and a neural network (400) with at least one hidden layer (410, 412) may be described as a "deep" neural network or as a "deep learning method". In general, a neural network (400) may have more than one node (402) in the output layer (414). In this case the neural network (400) may be referred to as a "multi-target" or "multi-output" network.

Nodes (402) and edges (404) carry additional associations. Namely, every edge is associated with a numerical value. The edge numerical values, or even the edges (404) themselves, are often referred to as "weights" or "parameters". While training a neural network (400), numerical values are assigned to each edge (404). Additionally, every node (402) is associated with a numerical variable and an activation function. Activation functions are not limited to any functional class, but traditionally follow the form $$A = f(\Sigma_{i \in (incoming)}[(\text{node value})_i(\text{edge value})_i])$$

where i is an index that spans the set of "incoming" nodes (402) and edges (404) and f is a user-defined function. Incoming nodes (402) are those that, when viewed as a graph (as in FIG. 4), have directed arrows that point to the node (402) where the numerical value is being computed. Some functions for f may include the linear function f(x)=x, sigmoid function $$f(x) = \frac{1}{1+e^{-x}},$$

and rectified linear unit function f(x)=max(0, x), however, many additional functions are commonly employed. Every node (402) in a neural network (400) may have a different associated activation function. Often, as a shorthand, activation functions are described by the function f by which it is composed. That is, an activation function composed of a linear function f may simply be referred to as a linear activation function without undue ambiguity.

When the neural network (400) receives an input, the input is propagated through the network according to the activation functions and incoming node (402) values and edge (404) values to compute a value for each node (402). That is, the numerical value for each node (402) may change for each received input. Occasionally, nodes (402) are assigned fixed numerical values, such as the value of 1, that are not affected by the input or altered according to edge (404) values and activation functions. Fixed nodes (402) are often referred to as "biases" or "bias nodes" (406), displayed in FIG. 4 with a dashed circle.

In some implementations, the neural network (400) may contain specialized layers (405), such as a normalization layer, or additional connection procedures, like concatenation. One skilled in the art will appreciate that these alterations do not exceed the scope of this disclosure.

As noted, the training procedure for the neural network (400) comprises assigning values to the edges (404). To begin training the edges (404) are assigned initial values. These values may be assigned randomly, assigned according to a prescribed distribution, assigned manually, or by some other assignment mechanism. Once edge (404) values have been initialized, the neural network (400) may act as a function, such that it may receive inputs and produce an output. As such, at least one input is propagated through the neural network (400) to produce an output. Recall, that a given data set will be composed of inputs and associated target(s), where the target(s) represent the "ground truth", or the otherwise desired output. The neural network (400) output is compared to the associated input data target(s). The comparison of the neural network (400) output to the target(s) is typically performed by a so-called "loss function"; although other names for this comparison function such as "error function", "misfit function", and "cost function" are commonly employed. Many types of loss functions are available, such as the mean-squared-error function, however, the general characteristic of a loss function is that the loss function provides a numerical evaluation of the similarity between the neural network (400) output and the associated target(s). The loss function may also be constructed to impose additional constraints on the values assumed by the edges (404), for example, by adding a penalty term, which may be physics-based, or a regularization term. Generally, the goal of a training procedure is to alter the edge (404) values to promote similarity between the neural network (400) output and associated target(s) over the data set. Thus, the loss function is used to guide changes made to the edge (404) values, typically through a process called "backpropagation".

While a full review of the backpropagation process exceeds the scope of this disclosure, a brief summary is provided. Backpropagation consists of computing the gradient of the loss function over the edge (404) values. The gradient indicates the direction of change in the edge (404) values that results in the greatest change to the loss function. Because the gradient is local to the current edge (404) values, the edge (404) values are typically updated by a "step" in the direction indicated by the gradient. The step size is often referred to as the "learning rate" and need not remain fixed during the training process. Additionally, the step size and direction may be informed by previously seen edge (404) values or previously computed gradients. Such methods for determining the step direction are usually referred to as "momentum" based methods.

Once the edge (404) values have been updated, or altered from their initial values, through a backpropagation step, the neural network (400) will likely produce different outputs. Thus, the procedure of propagating at least one input through the neural network (400), comparing the neural network (400) output with the associated target(s) with a loss function, computing the gradient of the loss function with respect to the edge (404) values, and updating the edge (404) values with a step guided by the gradient, is repeated until a termination criterion is reached. Common termination criteria are: reaching a fixed number of edge (404) updates, otherwise known as an iteration counter; a diminishing learning rate; noting no appreciable change in the loss function between iterations; reaching a specified performance metric as evaluated on the data or a separate hold-out data set. Once the termination criterion is satisfied, and the edge (404) values are no longer intended to be altered, the neural network (400) is said to be "trained".

In another embodiment, the machine-learned model is a convolutional neural network (CNN). A CNN is similar to a neural network (400) in that it can technically be graphically represented by a series of edges (404) and nodes (402) grouped to form layers. However, it is more informative to view a CNN as structural groupings of weights; where here the term structural indicates that the weights within a group have a relationship. CNNs are widely applied when the data inputs also have a structural relationship, for example, a spatial relationship where one input is always considered "to the left" of another input. Images (216) have such a structural relationship. Consequently, CNNs are particularly apt at processing images (216).

A structural grouping, or group, of weights is herein referred to as a "filter". The number of weights in a filter is typically much less than the number of inputs. In a CNN, the filters can be thought as "sliding" over, or convolving with, the inputs to form an intermediate output or intermediate representation of the inputs which still possesses a structural relationship. Like unto the neural network (400), the intermediate outputs are often further processed with an activation function. Many filters may be applied to the inputs to form many intermediate representations. Additional filters may be formed to operate on the intermediate representations creating more intermediate representations. This process may be repeated as prescribed by a user. There is a "final" group of intermediate representations, wherein no more filters act on these intermediate representations. Generally, the structural relationship of the final intermediate representations is ablated; a process known as "flattening". The flattened representation is usually passed to a neural network (400) to produce the final output. Note, that in this context, the neural network (400) is still considered part of the CNN. Like unto a neural network (400), a CNN is trained, after initialization of the filter weights, and the edge (404) values of the internal neural network (400), if present, with the backpropagation process in accordance with a loss function.

While multiple embodiments using different machine-learned models (302) have been suggested, one skilled in the art will appreciate that this process, of estimating the contamination of an incoming contaminated fluid (102) using an image (216), is not limited to the listed machine-learned models. Machine-learned models (302) such as a random forest, visual transformers (ViTs), or non-parametric methods such as K-nearest neighbors or a Gaussian process may be readily inserted into this framework and do not depart from the scope of this disclosure.

Using the categorical estimation of the contamination present in the incoming contaminated fluid (102), the control parameters of the sub-processes of the gas processing plant (100) may be adjusted. This adjustment is proactive in nature. Control parameters that may be adjusted include, but are not limited to: flow rates within the system; the amount of anti-foaming agent added to the system; the pressure of the flash drum (110); and the operating temperatures of the amine contactor (108) and the amine stripper (114). These adjustments may occur in real-time, or near real-time, as images (216) are continuously acquired by the camera (300) and processed by the machine-learned model (302). These adjustments may be made automatically or with human supervision. That is, the system may be configured such that the controllers (130) receive the contamination estimate from the machine-learned model (302) and automatically adjust the control parameters with the controllers (130). In other implementations, the machine-learned model (302) contamination estimate may be parsed by a human before adjustments are made to the control parameters of the sub-processes of the gas processing plant (100). Again, the control parameters may be updated using the controllers (130), however, the adjustment is not automatic and contains a "human-in-the-loop".

The adjustments, and implicitly the accuracy of the machine-learned model (302), are validated by monitoring the gas processing plant (100) using the plurality of sensors (124, 126, 128, and others not shown) associated with the sub-processes of the gas processing plant (100). Data signals from the plurality of sensors (124, 126, 128, and others not shown) disposed throughout the gas processing plant (100) are received by the controllers (130). Upon receiving the data signals, the machine-learned model (302) may be updated, altered, such as selecting a new model type and architecture, or re-trained.

Figure 5:
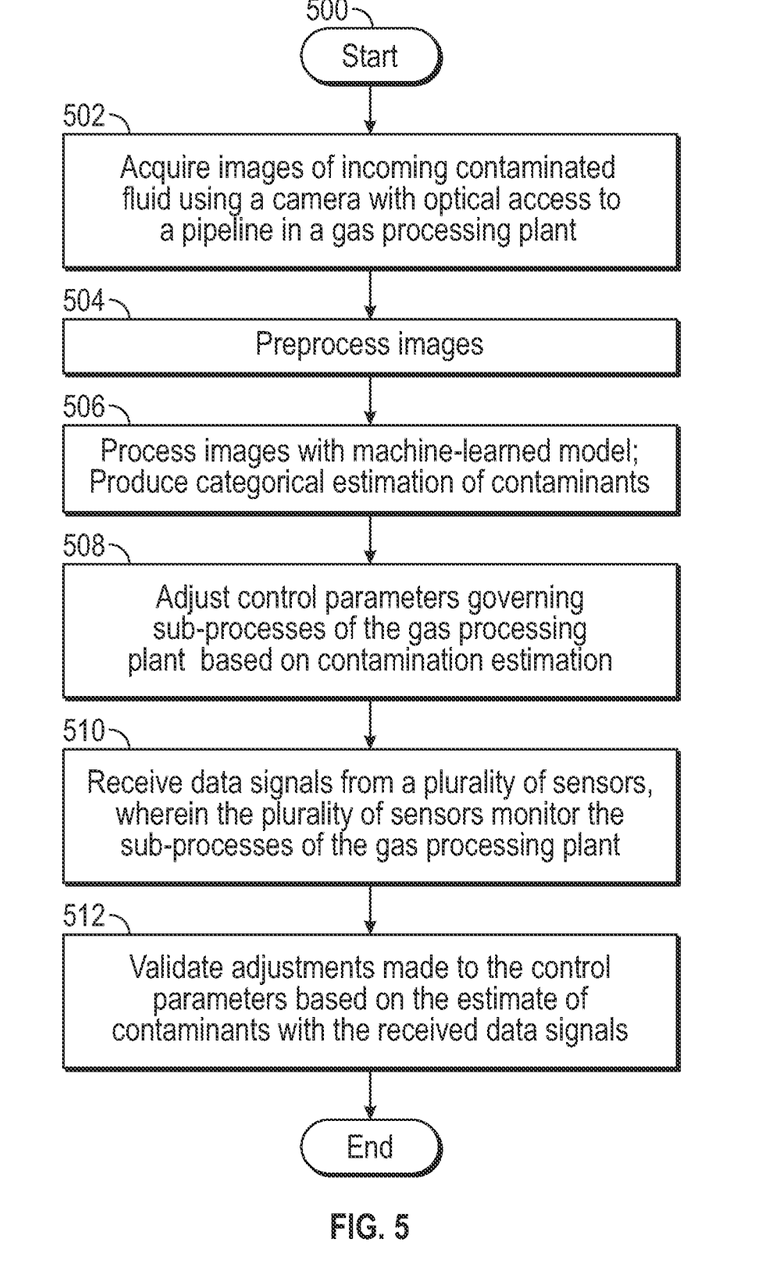
FIG. 5 depicts a flow chart, in accordance with one or more embodiments.

The method described by the present disclosure is succinctly summarized in the flow chart of FIG. 5. As depicted in block 502, images (216) of the incoming contaminated fluid (102) are acquired using a camera (300) embedded in the pipeline (201). The images (216) may be pre-processed, using any suitable pre-processing method, according to block 504. Pre-processing of the images (216) may include normalization, aggregating multiple images, or other techniques designed to reduce noise in the image (216) and increase image (216) quality. One with ordinary skill in the art will appreciate that many image pre-processing techniques exist and the fact that they are not enumerated herein does not impose a limit on the present disclosure. In some embodiments, the images (216) are not pre-processed, such that the pre-processed images (216) are identical to the original images (216).

The pre-processed images (216) are processed with a machine-learned model (302) to produce a categorical estimation of the contaminants present in the incoming contaminated fluid (102), as shown in block 506. Block 508 illustrates that the control parameters of the sub-processes of the gas processing plant (100) are adjusted based on the contamination estimate produced by the machine-learned model. Again, these control parameters may include, but are not limited to: flow rates within the system; the amount of anti-foaming agent added to the system; and the pressure of the flash drum (110). These adjustments may occur in real-time, or near real-time, as images (216) are continuously acquired by the camera (300) and processed by the machine-learned model (302). The adjustments may be made automatically or with a human-in-the-loop. While the gas processing plant (100) is operational, data signals from the plurality of sensors, representing the state of the sub-processes of the gas processing plant (100) are received, as shown in block 510. For example, the state of a flash drum (110) may be described by its current pressure and current flow rate of the exiting flashed gases. As seen in block 512, using the received data signals, the adjustments to the control parameters are validated. If, at any point, the adjustments made to the control parameters of the gas processing plant (100) are found to worsen the state of the gas processing plant (100), such as by reducing the production of decontaminated gas (109) or placing any sub-process in an unsafe operating state, the machine-learned model (302) may be updated, altered, replaced, re-selected, or re-trained. Example indicators of sub-optimal performance in the gas-processing plant (100) may include, but are not limited to, level fluctuations in the amine contractor (108), large differential pressure in the amine stripper (114), and high flow rate of flashed gases exiting the flash drum (110).

While the various blocks in FIG. 5 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

Figure 6:
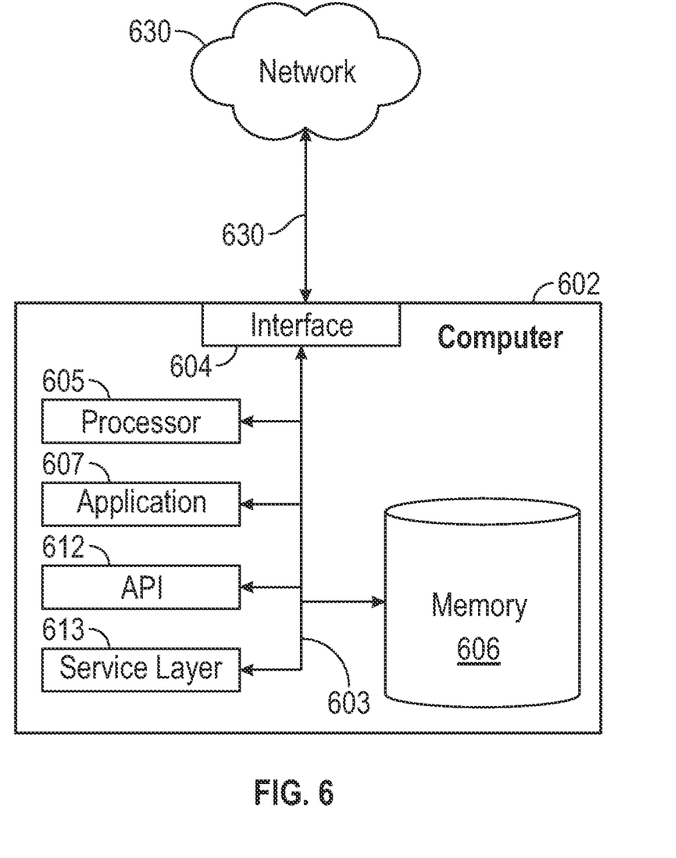
FIG. 6 depicts a system, in accordance with one or more embodiments.

Embodiments may be implemented on a computer system. FIG. 6 is a block diagram of a computer system (602) used to provide computational functionalities associated with described algorithms, methods, functions, processes, flows, and procedures as described in the instant disclosure, according to one or more embodiments. The illustrated computer (602) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (602) may include a computer that includes an input device, such as a keypad, keyboard, touch screen, or other device that can accept user information, and an output device that conveys information associated with the operation of the computer (602), including digital data, visual, or audio information (or a combination of information), or a GUI.

The computer (602) can serve in a role as a client, network component, a server, a database or other persistency, or any other component (or a combination of roles) of a computer system for performing the subject matter described in the instant disclosure. In some implementations, one or more components of the computer (602) may be configured to operate within environments, including cloud-computing-based, local, global, or other environment (or a combination of environments).

At a high level, the computer (602) is an electronic computing device operable to receive, transmit, process, store, or manage data and information associated with the described subject matter. According to some implementations, the computer (602) may also include or be communicably coupled with an application server, e-mail server, web server, caching server, streaming data server, business intelligence (BI) server, or other server (or a combination of servers).

The computer (602) can receive requests over network (630) from a client application (for example, executing on another computer (602) and responding to the received requests by processing the said requests in an appropriate software application. In addition, requests may also be sent to the computer (602) from internal users (for example, from a command console or by other appropriate access method), external or third-parties, other automated applications, as well as any other appropriate entities, individuals, systems, or computers.

Each of the components of the computer (602) can communicate using a system bus (603). In some implementations, any or all of the components of the computer (602), both hardware or software (or a combination of hardware and software), may interface with each other or the interface (604) (or a combination of both) over the system bus (603) using an application programming interface (API) (612) or a service layer (613) (or a combination of the API (612) and service layer (613). The API (612) may include specifications for routines, data structures, and object classes. The API (612) may be either computer-language independent or dependent and refer to a complete interface, a single function, or even a set of APIs. The service layer (613) provides software services to the computer (602) or other components (whether or not illustrated) that are communicably coupled to the computer (602). The functionality of the computer (602) may be accessible for all service consumers using this service layer. Software services, such as those provided by the service layer (613), provide reusable, defined business functionalities through a defined interface. For example, the interface may be software written in JAVA, C++, or other suitable language providing data in extensible markup language (XML) format or another suitable format. While illustrated as an integrated component of the computer (602), alternative implementations may illustrate the API (612) or the service layer (613) as stand-alone components in relation to other components of the computer (602) or other components (whether or not illustrated) that are communicably coupled to the computer (602). Moreover, any or all parts of the API (612) or the service layer (613) may be implemented as child or sub-modules of another software module, enterprise application, or hardware module without departing from the scope of this disclosure.

The computer (602) includes an interface (604). Although illustrated as a single interface (604) in FIG. 6, two or more interfaces (604) may be used according to particular needs, desires, or particular implementations of the computer (602). The interface (604) is used by the computer (602) for communicating with other systems in a distributed environment that are connected to the network (630). Generally, the interface (604) includes logic encoded in software or hardware (or a combination of software and hardware) and operable to communicate with the network (630). More specifically, the interface (604) may include software supporting one or more communication protocols associated with communications such that the network (630) or interface's hardware is operable to communicate physical signals within and outside of the illustrated computer (602).

The computer (602) includes at least one computer processor (605). Although illustrated as a single computer processor (605) in FIG. 6, two or more processors may be used according to particular needs, desires, or particular implementations of the computer (602). Generally, the computer processor (605) executes instructions and manipulates data to perform the operations of the computer (602) and any algorithms, methods, functions, processes, flows, and procedures as described in the instant disclosure.

The computer (602) also includes a memory (606) that holds data for the computer (602) or other components (or a combination of both) that can be connected to the network (630). The memory may be a non-transitory computer readable medium. For example, memory (606) can be a database storing data consistent with this disclosure. Although illustrated as a single memory (606) in FIG. 6, two or more memories may be used according to particular needs, desires, or particular implementations of the computer (602) and the described functionality. While memory (606) is illustrated as an integral component of the computer (602), in alternative implementations, memory (606) can be external to the computer (602).

The application (607) is an algorithmic software engine providing functionality according to particular needs, desires, or particular implementations of the computer (602), particularly with respect to functionality described in this disclosure. For example, application (607) can serve as one or more components, modules, applications, etc. Further, although illustrated as a single application (607), the application (607) may be implemented as multiple applications (607) on the computer (602). In addition, although illustrated as integral to the computer (602), in alternative implementations, the application (607) can be external to the computer (602).

There may be any number of computers (602) associated with, or external to, a computer system containing computer (602), wherein each computer (602) communicates over network (630). Further, the term "client," "user," and other appropriate terminology may be used interchangeably as appropriate without departing from the scope of this disclosure. Moreover, this disclosure contemplates that many users may use one computer (602), or that one user may use multiple computers (602).

Embodiments of the present disclosure may provide at least one of the following advantages. The control parameters governing the sub-processes of the gas-processing plant (100) may be adjusted according to the composition and contamination of the incoming contaminated fluid (102). Because the efficacy of the gas processing plant (100) is dependent on the interaction of the incoming contaminated fluid (102) and the control parameters, the control parameters may be adjusted proactively to prevent upsets in the gas processing plant (100). For example, the appropriate amount of an anti-foam agent may be injected into the system. The control parameters may be adjusted in real-time, or in near real-time, according to the transient nature of the incoming contaminated fluid (102). By adjusting the control parameters ahead of time, or in anticipation of the contaminants in the incoming contaminated fluid (102), issues occur within the gas processing plant (100) with reduced frequency. This, in turn, minimizes down-time of the gas processing plant (100), mitigates loss of production, and ensures that the resulting decontaminated gas (109) meets specifications. In short, embodiments of the present disclosure promote greater optimization of a gas processing plant (100) through real-time adjustments to the governing control parameters according to the contamination and composition of the incoming contaminated fluid (102).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A method to optimize a gas processing plant with control parameters, comprising:
    acquiring a plurality of images, using a camera disposed at a first location in the gas processing plant, of an incoming contaminated fluid;
    processing, by a computer processor, the plurality of images by a machine-learned model to produce a contamination estimate, the contamination estimate comprising a segmentation map and a classification of hydrocarbon liquid carryover;
    adjusting the control parameters of the gas processing plant, forming adjusted control parameters based on, at least in part, the contamination estimate, wherein the adjusted control parameters comprise an amount of anti-foam agent to be injected into a sub-processes of the gas processing plant that is downstream from the first location;
    receiving a plurality of data signals from a plurality of sensors configured to monitor the gas processing plant, wherein the plurality of sensors are downstream from the first location; and
    validating the adjusted control parameters with the received data signals by verifying that the adjusted control parameters optimize, or at least improve the performance of, the gas processing plant.

2. The method of claim 1, further comprising:
    selecting a machine-learned model type and an architecture;
    training the machine-learned model with a data set; and
    altering the machine-learned model type and/or architecture, or re-training the machine-learned model based, at least in part, on the plurality of received data signals.

3. The method of claim 1, wherein the machine-learned model is a convolutional neural network.

4. The method of claim 1, wherein the camera may acquire images of the incoming contaminated fluid in real-time, or near real-time.

5. The method of claim 1, wherein the control parameters are adjusted by a human-in-the-loop.

6. The method of claim 1, wherein the plurality of sensors comprise:
    a plurality of first pressure indicator disposed in an amine contactor;
    a plurality of second pressure indicator disposed in an amine stripper;

a plurality of first level indicator disposed in an amine contactor;

a plurality of second level indicator disposed in an amine stripper; and a plurality of flow rate indicators disposed throughout the gas processing plant.

7. The method of claim 1, wherein the plurality of data signals are received by a plurality of controllers.

8. The method of claim 6, wherein the plurality of flow rate indicators comprise multi-phase flow rate indicators.

9. The method of claim 7, wherein the control parameters are adjusted automatically by the plurality of controllers.

10. A non-transitory computer readable medium storing instructions executable by a computer processor, the instructions comprising functionality for:

receiving a plurality of images from a camera disposed at a first location of a gas processing plant of an incoming contaminated fluid;

processing the plurality of images by a machine-learned model to produce a contamination estimate, the contamination estimate comprising a segmentation map and a classification of hydrocarbon liquid carryover;

adjusting a plurality of control parameters for the gas processing plant, forming adjusted control parameters based on, at least in part, the contamination estimate, wherein the adjusted control parameters comprise an amount of anti-foam agent to be injected into a sub-processes of the gas processing plant that is downstream from the first location;

receiving a plurality of data signals from a plurality of sensors configured to monitor of the gas-processing plant, wherein the plurality of sensors are downstream from the first location; and validating the adjusted control parameters with the received data signals by verifying that the adjusted control parameters optimize, or at least improve the performance of, the gas processing plant.

11. The non-transitory computer readable medium of claim 10, further comprising instructions for:

training a selected machine-learned model with a data set; and altering the selected machine-learned model type and/or architecture, or re-training the selected machine-learned model based, at least in part, on the plurality of data signals.

12. The non-transitory computer readable medium of claim 10, wherein the machine-learned model is a convolutional neural network.

13. The non-transitory computer readable medium of claim 10, wherein images from the camera are received in real-time, or near real-time.

14. The non-transitory computer readable medium of claim 10, wherein the control parameters are adjusted by a human-in-the-loop.

15. The non-transitory computer readable medium of claim 10, wherein the plurality of data signals are received by a plurality of controllers.

16. The non-transitory computer readable medium of claim 15, further comprising instructions for automatically adjusting the plurality of control parameters by the plurality of controllers.

17. A system, comprising:

at a gas processing plant configured to receive an incoming contaminated fluid, the gas processing plant comprising:

a camera disposed at a first location of the gas processing plant and capable of capturing images in real-time, wherein the camera has optical access to the incoming contaminated fluid;

a plurality of sub-processes and associated mechanical devices wherein each sub-process is governed by at least one control parameter of a plurality of control parameters, wherein the plurality of control parameters comprises an amount of an anti-foam agent to be injected into the gas processing plant at a location that is downstream from the first location, a plurality of sensors disposed downstream from the first location that which produce a plurality of data signals, and a plurality of controllers wherein the plurality of controllers receive the plurality of data signals and can adjust the plurality of control parameters, a computer communicably connected to the plurality of controllers and the camera and comprises:

one or more computer processors, and a non-transitory computer readable medium storing instructions executable by a computer processor, the instructions comprising functionality for:

acquiring a plurality of images from the camera of the incoming contaminated fluid;

processing the plurality of images by a machine-learned model to produce a contamination estimate, the contamination estimate comprising a segmentation map and a classification of hydrocarbon liquid carryover;

adjusting, either automatically or with a human-in-the-loop, the control parameters the gas processing plant, forming an adjusted control parameters based on, at least in part, the contamination estimate;

receiving the plurality of data signals; and validating the adjusted control parameters with the received data signals by verifying that the adjusted control parameters optimize, or at least improve the performance of, the gas processing plant.

18. The system of claim 17, further comprising instructions for:

training a machine-learned model with a data set; and altering the machine-learned model type and/or architecture, or re-training the machine-learned model based, at least in part, on the plurality of data signals.

19. The method of claim 2, wherein the data set is generated in a laboratory setting where various states of the incoming contaminated fluid are induced to form associated labels.

20. The non-transitory computer readable medium of claim 11, wherein the data set is generated in a laboratory setting where various states of the incoming contaminated fluid are induced to form associated labels.

21. The system of claim 18, wherein the data set is generated in a laboratory setting where various states of the incoming contaminated fluid are induced to form associated labels.

* * * * *